(12) United States Patent
Rycken

(10) Patent No.: US 12,175,860 B2
(45) Date of Patent: Dec. 24, 2024

(54) ROAD SAFETY WARNING SYSTEM FOR PEDESTRIAN

(71) Applicant: TOYOTA MOTOR EUROPE, Brussels (BE)

(72) Inventor: Tom Rycken, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/925,158

(22) PCT Filed: May 15, 2020

(86) PCT No.: PCT/EP2020/063576
§ 371 (c)(1),
(2) Date: Nov. 14, 2022

(87) PCT Pub. No.: WO2021/228405
PCT Pub. Date: Nov. 18, 2021

(65) Prior Publication Data
US 2023/0182640 A1    Jun. 15, 2023

(51) Int. Cl.
*G08G 1/005* (2006.01)
*B60Q 1/00* (2006.01)
(Continued)

(52) U.S. Cl.
CPC .......... *G08G 1/005* (2013.01); *B60Q 1/0023* (2013.01); *B60Q 1/525* (2013.01); *B60Q 9/008* (2013.01); *B60Q 2400/50* (2013.01)

(58) Field of Classification Search
None
See application file for complete search history.

(56) References Cited

U.S. PATENT DOCUMENTS 6,396,397 B1 * 5/2002 Bos .......................... B60R 1/12
  348/E7.086
8,553,088 B2 * 10/2013 Stein .................... B60Q 1/1423
  382/104

(Continued)

FOREIGN PATENT DOCUMENTS

EP    2896937 A1    7/2015
EP    3531391 A1    8/2019
(Continued)

OTHER PUBLICATIONS

International Search Report dated Feb. 9, 2021; International Application No. PCT/EP2020/063576.

*Primary Examiner* — Muhammad Adnan
(74) *Attorney, Agent, or Firm* — Dinsmore & Shohl LLP

(57) ABSTRACT

Process for warning a road user of another road user's presence on another side of an object situated therebetween, including: detecting a first road user on a first exterior side of the object, detecting a second road user on a second exterior side of the object, different from the first side, the first and second road users being detected to be moving or ready to move relative to the object; and signaling detection of the second road user to the first road user when the first and second road users are detected concurrently. Warning system including means for carrying out same. Vehicle including such a warning system and/or configured to implement such a process. Computer program including instructions which, when the program is executed by a computer, cause the computer to execute such a process. Computer-readable medium, including instructions of same.

21 Claims, 3 Drawing Sheets

(51) Int. Cl.
*B60Q 1/50* (2006.01)
*B60Q 9/00* (2006.01)

(56) References Cited

U.S. PATENT DOCUMENTS

| | | | | |
|---|---|---|---|---|
| 9,592,764 | B2* | 3/2017 | Randler | B60Q 9/008 |
| 10,134,280 | B1* | 11/2018 | You | B60Q 1/525 |
| 11,501,619 | B2* | 11/2022 | Cherney | G08B 21/02 |
| 2007/0229238 | A1* | 10/2007 | Boyles | G06T 7/0008 |
| | | | | 348/148 |
| 2014/0002657 | A1* | 1/2014 | Kim | G06V 10/255 |
| | | | | 348/148 |
| 2015/0228195 | A1* | 8/2015 | Beaurepaire | B60Q 1/547 |
| | | | | 340/907 |
| 2015/0258928 | A1* | 9/2015 | Goto | B60Q 1/525 |
| | | | | 701/49 |
| 2016/0121791 | A1* | 5/2016 | Shimizu | B60Q 1/525 |
| | | | | 340/435 |
| 2016/0129840 | A1* | 5/2016 | Schofield | G01S 13/931 |
| | | | | 348/148 |
| 2016/0229415 | A1* | 8/2016 | Laakmann | B60N 2/0025 |
| 2017/0028915 | A1* | 2/2017 | Lee | G06V 20/58 |
| 2018/0118106 | A1* | 5/2018 | You | G08G 1/005 |
| 2018/0261081 | A1* | 9/2018 | Suzuki | B60Q 1/525 |
| 2018/0297511 | A1* | 10/2018 | Park | B60Q 1/143 |
| 2020/0114813 | A1* | 4/2020 | Lujan | B60Q 1/507 |
| 2020/0198534 | A1* | 6/2020 | Ito | G08G 1/005 |
| 2021/0016704 | A1* | 1/2021 | Philipp | B60Q 1/0023 |
| 2021/0370823 | A1* | 12/2021 | Stein | G06V 20/588 |
| 2021/0370829 | A1* | 12/2021 | Lee | B60Q 9/008 |

FOREIGN PATENT DOCUMENTS

| | | | |
|---|---|---|---|
| SE | 1550100 A1 | 8/2016 | |
| WO | WO-2018128946 A1 * | 7/2018 | G08G 1/162 |

* cited by examiner

ROAD SAFETY WARNING SYSTEM FOR PEDESTRIAN

CROSS REFERENCE TO RELATED APPLICATION

This application is a National Stage of International Application PCT/EP2020/063576 filed on May 15, 2020, the entire contents of which are hereby incorporated by reference.

FIELD

The present disclosure relates to the field of road safety, for example pedestrian safety.

BACKGROUND ART

Advanced driver assistance systems provide a vehicle with a sensing capability that can be used to alert the vehicle's driver of an item situated in the vehicle's blind spot and/or travel path. Such systems may even classify the item according to one or more archetypes, such as cars, cyclists, pedestrians, animals.

It is known, for example, for an advanced driver assistance system to warn an occupant of a first vehicle (situated inside the first vehicle) that a bicycle or a second vehicle is approaching the first vehicle in a way that would render opening a door of the first vehicle hazardous.

SUMMARY

The inventors have recognized that detection of objects in a vehicle's surroundings may be usefully conveyed to road users who are situated outside of the vehicle. To that end, according to an example of the present disclosure, a process may be provided for warning a road user of another road user's presence on another side of an object situated therebetween. The process includes detecting a first road user on a first exterior side of the object and a second road user on a second exterior side of the object. The second exterior side is different from the first exterior side. The first and second road users are detected to be moving or ready to move relative to the object. The process includes signaling detection of the second road user to the first road user.

Such a process may allow for the first road user to be warned of the second road user. In this way, it may be possible to improve the safety of the first and/or second road user(s).

Signaling detection of the second road user to the first road user may be performed when the first and second road users are detected concurrently.

Additionally or alternatively, signaling detection of the second road user to the first road user when the first and second road users are detected non-concurrently.

The process may include determining whether a probability of a collision between the first and second road users exceeds a collision threshold. Signaling may be performed when the probability of the collision exceeds the collision threshold.

The process may include signaling detection of the first road user to the second road user.

The process may include waiting to detect the second road user until the first road user has been detected. Waiting may include placing a warning system in a low-power mode. The process may also include an activation step. The activation step may include switching the warning system to a full power mode in which detection of the second road user is possible. The activation step may be carried out when the first road user has been detected.

Signaling may include illuminating a light source and/or emitting a sound.

Signaling may include projecting an image in a vicinity of the object and/or displaying an illuminated sign.

The process may include classifying the first and/or second road user(s) on the basis of one or more road user archetypes.

The object may be a vehicle.

The vehicle may be a manned vehicle.

The process may be performed while the vehicle lacks occupants. Additionally or alternatively, the process may be performed while the vehicle is in a deactivated state.

The vehicle may include an internal combustion engine. The step of detecting the first road user may be performed when the internal combustion engine is deactivated. Additionally or alternatively, the step of detecting the second road user may be performed when the internal combustion engine is deactivated.

The first exterior side may be at a front of the vehicle or at a first lateral side of the vehicle.

The second exterior side may be at a rear of the vehicle or at a second lateral side of the vehicle.

According to an example of the present disclosure, a warning system may be provided, including means for carrying out a process for warning road users of each other's presence as described earlier herein.

According to an example of the present disclosure, a warning system may be provided, including a sensing system and a signaling system. The sensing system is configured to detect a first road user at a first location and to detect a second road user at a second location with respect to an object situated therebetween and to detect that the first and second road users are in motion or ready to be in motion with respect to the object. The signaling system is configured to perform signaling to the first road user that the sensing system has detected the second road user. Additionally or alternatively, the signaling system is configured to perform signaling to the second road user that the sensing system has detected the first road user.

Such a warning system may be able to relay information related to one of the detected road users to the other of the detected road users.

The signaling system may include a visual signaling unit and/or an acoustic signaling unit.

The sensing system may include a ranging system configured to output a distance to a detected item.

The sensing system may include one or more of the following: a radar antenna, an ultrasound receiver, a LiDAR, a camera.

The warning system may include a processing unit. The processing unit may be configured to perform determination of a likelihood of a collision between the first and second road users. Additionally or alternatively, the processing unit may be configured to perform comparison of the likelihood of the collision to a collision threshold and signaling only when the probability of the collision exceeds the collision threshold. Additionally or alternatively, the processing unit may be configured to perform classification of the first and/or second road users according to one or more road user archetypes.

The first location may be in a vicinity of a first exterior side of a vehicle. The second location may be in a vicinity of a second exterior side of the vehicle, different from the first exterior side.

According to an example of the present disclosure, a vehicle may be provided. The vehicle includes a warning system as described earlier herein. Additionally or alternatively, the vehicle is configured to implement a process of warning road users of each other's presence as described earlier herein.

Such a vehicle may improve road safety.

The vehicle may be configured to limit electrical energy supplied for detection of the second road user when the vehicle is placed in a parked mode.

According to an example of the present disclosure, a computer program may be provided. The computer program includes instructions which, when the program is executed by a computer, cause the computer to carry out a process of warning road users of each other's presence as described earlier herein.

According to an example of the present disclosure, a data carrier signal may be provided. The data carrier signal carries the computer program as described earlier herein.

According to an example of the present disclosure, a computer-readable medium may be provided, including instructions of the computer program as described herein.

BRIEF DESCRIPTION OF THE DRAWINGS

The disclosure may be more completely understood in consideration of the following detailed description of aspects of the disclosure in connection with the accompanying drawings, in which.

Figure 1:
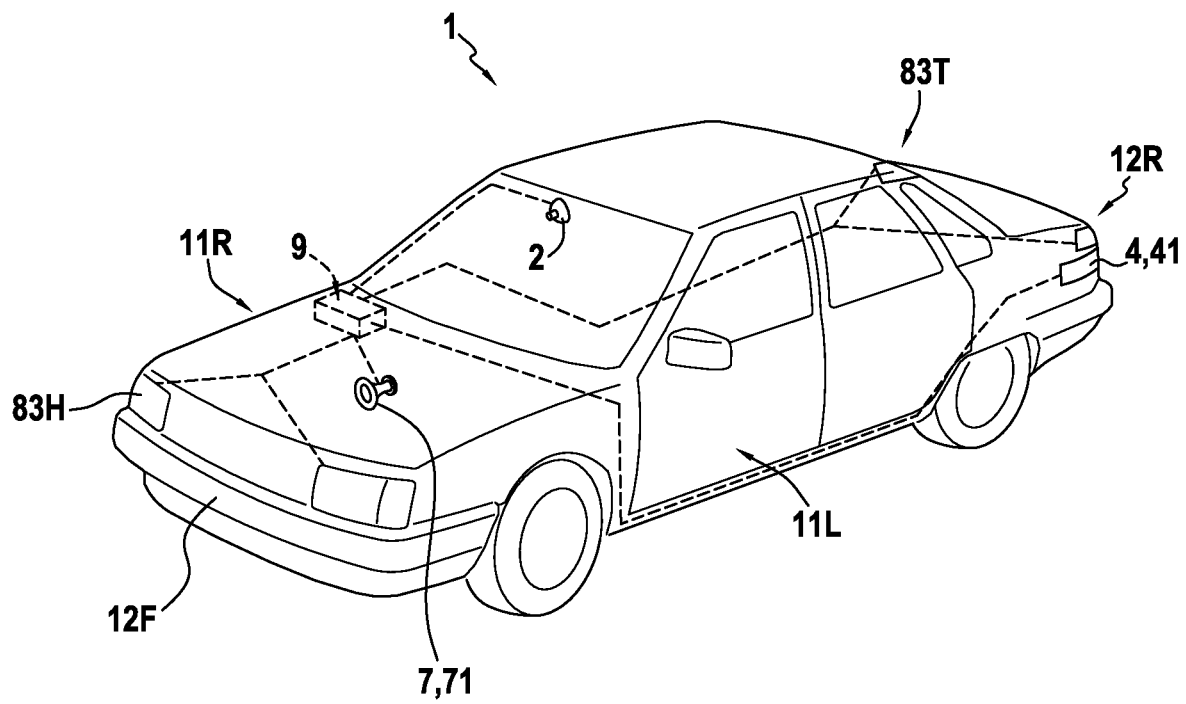
FIG. 1 shows an exemplary vehicle in a front view.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

FIG. 1 shows an exemplary car 1, with its forward extremity (including front exterior side 12F) arranged towards the viewer and with its lateral side visible (in this case left lateral side 11L is visible and right lateral side 11R is arranged way from the viewer). A car is a non-limiting example of a motor vehicle.

In a conventional manner, the car 1 includes a front camera 2 mounted in a vicinity of the car's windshield. A front camera is a non-limiting example of a front sensor. The term "front sensor" may be understood to designate a sensor arranged to detect an item (for example a road user) in a vicinity of a front exterior side of a vehicle. Other non-limiting examples of front sensors include forward-oriented ranging systems, such as LIDAR, radar, and sonar, for example.

The front camera 2 may be provided as any camera suitable for known driver assistance systems or the like.

In a conventional manner, the car 1 includes a ranging system 4 arranged to detect items in a vicinity of the left exterior side 11L of the car, and in a vicinity of a rear exterior side 12R (arranged away from the viewer) of the car. Detecting items in these locations with respect to a vehicle is commonly described as "blind spot detection", and the sensors arranged to provide this detection are commonly called "blind spot sensors". As a non-limiting example the ranging system 4 may be used to provide blind spot detection, and may be a blind spot sensor of the vehicle. The ranging system may include a short-range radar, for example.

In a conventional manner, the car 1 may include a horn 7 (and/or other sound emission device 71) and/or one or more lights, (for example headlight/s 83H, and/or taillight/s 83T) for communicating with road users and/or illuminating the road during driving. Lights, be they for communicating with road users or for illuminating the road during driving or for both communicating and illuminating, may be considered to be non-limiting examples of light sources.

The car 1 includes an exemplary warning system 9. It is also contemplated to provide such a warning system in other vehicle types.

Although the warning system will be described with regard to its use as part of a vehicle (as a vehicle warning system), it is also contemplated to use such a warning system independently of a vehicle, as a non-vehicular warning system.

The warning system 9 is configured to detect a first road user at a first location and a second road user at a second location, and to signal to the first and/or second road users. The first and second locations may be separated from one another by an object.

A warning system provided as part of a vehicle may be known as a vehicle warning system. In the case of a vehicle warning system, the object separating the first the first location from the second location may be the vehicle itself. The object can also be another object than the vehicle itself, for instance another vehicle. The first and second locations may be locations with respect to the vehicle.

Figure 2:
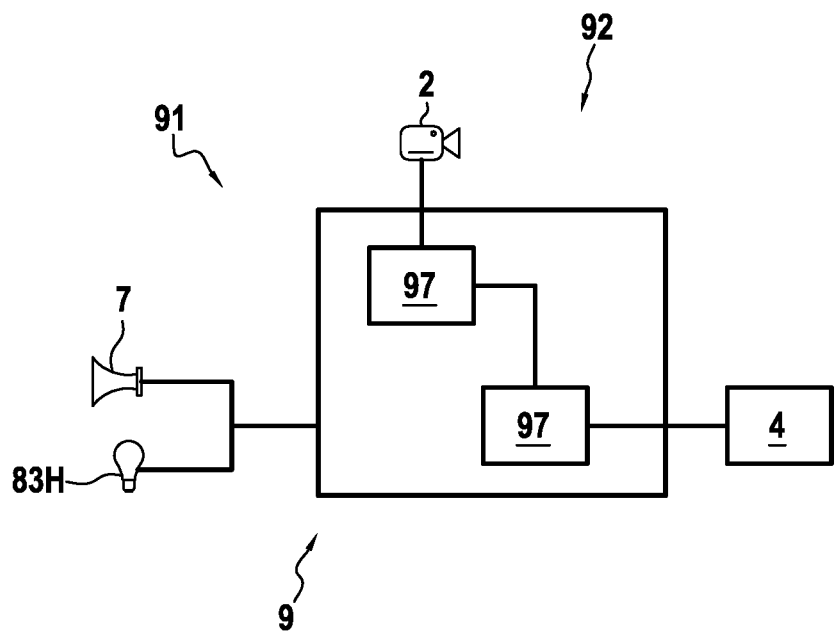
FIG. 2 shows an exemplary warning system.

FIG. 2 shows a schematic view of the warning system 9 visible in FIG. 1. The warning system may include one or more processors 97. When multiple processors 97 are provided, said processors may be connected to each other.

The processor(s) 97 are connected to one or more signaling devices (for example the lights 83T/H and/or horn 7 described earlier herein) to form a signaling system 91 of the warning system 9.

The processor(s) 97 are also connected to one or more sensors (for example the front camera 2 and the ranging system 4 described earlier herein) to form a sensing system 92 of the warning system 9. When multiple processors 97 and multiple sensors are provided, each sensor may be connected to its own corresponding processor. However, it is also contemplated for a given processor to be connected to multiple sensors.

The structure and operation of the warning system 9 will be discussed in greater detail with regard to FIGS. 3 and 4.

Figure 3:
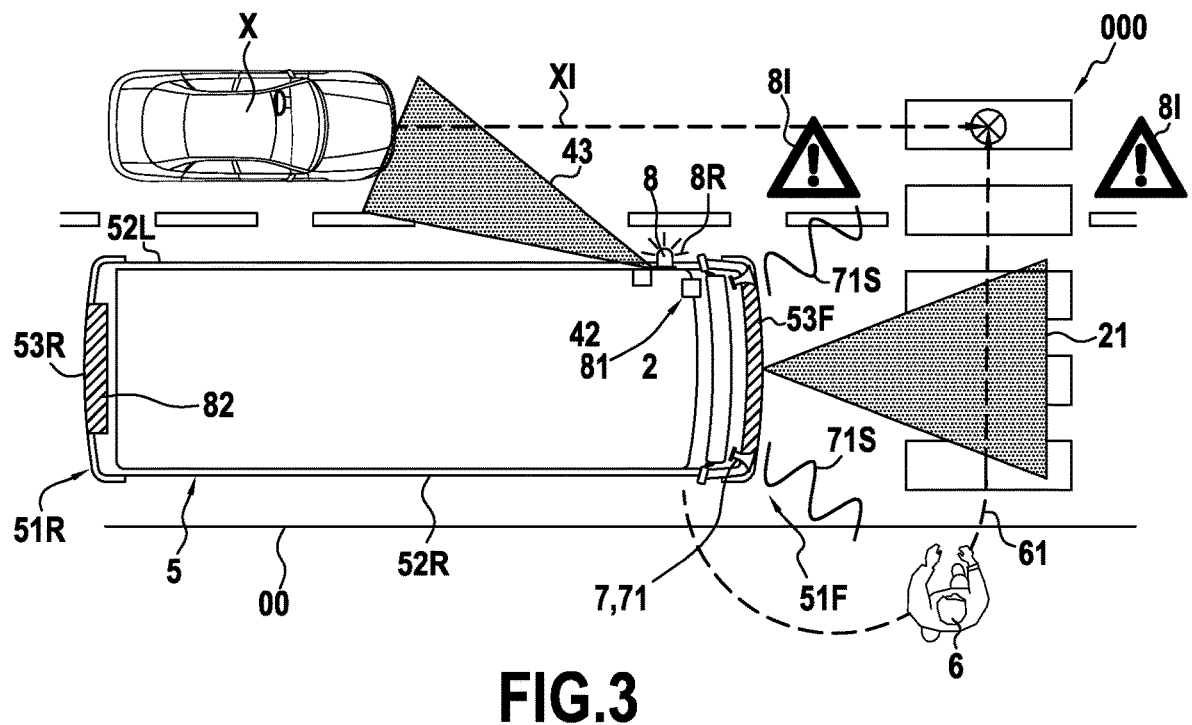
FIG. 3 shows a schematic of an exemplary vehicle stopped at an intersection.

FIG. 3 shows a motor vehicle (in this case a bus 5) in a drivable state (in this case stopped on a street 00 while operational). A street is a non-limiting example of a road. Other examples of roads include highways, freeways, driveways, and the like.

A crosswalk 000 is present on the street 00 in a vicinity of a forward extremity 51F of the bus 5. A crosswalk is a non-limiting example of an intersection between a street and a walkway. It may be understood, however, that a walkway (or other walking area) may intersect a road even when no crosswalk is provided.

A pedestrian 6 is shown following an itinerary 61 that is partially represented as an arrow leading from a vicinity of a right exterior side 52R of the bus 5 (for example from a passenger loading/unloading door of the bus), around the forward extremity 51F of the bus such that the pedestrian is in a vicinity of a front exterior side 53F of the bus, and towards a vicinity of a left exterior side 52L of the bus. Such an itinerary 61 may be representative of an itinerary of a former passenger after s/he exits the bus 5 and crosses the street 00, for example. In following this itinerary 61, the pedestrian 6 is made to enter the street 00. The pedestrian 6 can be considered to be a non-limiting example of a non-vehicular road user. Other non-limiting examples of non-vehicular road users include non-human animals, such as wild animals, livestock, pets and the like.

A car X is shown on the street 00 in the vicinity of the left exterior side 52L of the bus 5. The car X is in a drivable state and may be considered to be a non-limiting example of a vehicular road user (in this case a motorized vehicular road user). Other non-limiting examples of vehicular road users include non-motorized vehicular road users such as cyclists and the like.

An occupant of the car X may also be considered a vehicular road user, whether s/he is driving the car (for example in the case of a human-driven car or semi-autonomously-driven car) or not (for example in the case of an autonomous car). For the purposes of simplicity, the car X and its occupant in this example may be considered to constitute a single vehicular road user.

The itinerary XI of the car X is partially represented as an arrow extending towards the crosswalk 000. In following this itinerary XI, the car X is made to approach the crosswalk 000.

The itinerary XI of the car X and the itinerary 61 of the pedestrian 6 are seen to intersect one another. Concurrent arrival at the intersection of itineraries by the car X and the pedestrian 6 may lead to a collision therebetween which could be dangerous for the car (and/or occupant thereof) and/or the pedestrian. However, the presence of the bus 5 at the crosswalk 000 may make it difficult for the driver of the car X (be it a human or an automated driving system) and/or for the pedestrian 6 to avoid such a collision, because line-of-sight between the pedestrian and the car is blocked during much of their respective voyages along their respective itineraries XI, 61.

The bus 5 includes a warning system 9 including a sensing system and a signaling system. The sensing system is configured to detect the road users around the bus 5 and moreover, to detect whether the detected road users are in motion or ready to be in motion with respect to the bus 5.

The sensing system is configured to detect, when two road users in motion or ready to be in motion with respect to the bus 5 have been detected around the bus, to detect whether said two users are located on two different exterior sides of an object (in this case the bus itself), the object being situated between the two road users. In this case, the sensing system sends a signaling request to the signaling system of the warning system 9.

The signaling system is configured, when the above circumstances have been detected, to signal to one road user that the sensing system has detected the other road user, or even to signal detection of both road users to each other. The warning system 9 includes a front camera 2. The field of view of the front camera 2 may be substantially equivalent to those of the front camera described with respect to FIG. 1, for example.

A detection area 21 of the front camera 2 is represented at least in part as a triangular or pyramidal or conical region extending forward from the bus's forward extremity 51F (in this case towards the crosswalk 000). The detection area 21 of the front camera 2 may correspond, for example, to an area of the field of view of the front camera in which a pedestrian 6 may be detected and identified as a road user.

The detection area 21 may represent all or one or more portions of the front camera's field of view, for example.

As the pedestrian 6 follows his/her itinerary 61, s/he enters the detection area 21 of the front camera 2.

The bus 5 includes an environment sensor 42. The environment sensor 42 may include a ranging system as described earlier with regard to FIG. 1. As a non-limiting example, the environment sensor 42 may be configured to serve as a blind spot sensor of the bus.

The environment sensor 42 may be arranged near the forward extremity 51F of the bus 5. The environment sensor 42 may be arranged so that a coverage area of the environment sensor extends rearward relative to the bus 5 from the environment sensor.

A detection area 43 of the environment sensor 42 is represented at least in part as a triangular or pyramidal or conical region extending from the bus's left exterior side 52L towards the bus's rear extremity 51R. The detection area 43 of the environment sensor 42 may correspond, for example, to a portion of the coverage area in which a vehicle can be detected and identified as being potentially dangerous to road users in a vicinity of the forward extremity 51F of the bus 5.

The detection area 43 may represent all or one or more portions of the coverage area of the environment sensor 42. For example, the detection area 43 may extend up to 45 meters rearward with respect to the bus 5 from the environment sensor 42. For example, the detection area 43 may extend up to 30 meters rearward with respect to the bus 5 from the environment sensor 42. The horizontal angular coverage of the detection area 43 of the environment sensor 42 may be approximately 75 degrees to either lateral side of the bus 5, for example.

As the car X follows its itinerary XI, it enters the detection area 43 of the environment sensor 42.

The bus 5 includes a horn 7. A horn is a non-limiting example of a sound emission device 71. Other examples of sound emission devices include buzzers, loudspeakers, bells and the like.

In a conventional manner, the horn 7 may be arranged to emit sound in a forward direction of the bus 5 from the bus's forward extremity 51F.

The bus 5 includes a warning light 8, which may be arranged on a left front portion of the roof of the bus 5, for example. A warning light 8 is a non-limiting example of a light source.

When the car X and the pedestrian 6 are detected concurrently, for example by the environment sensor 42 and the front camera 2, respectively, the bus 5 may signal detection of the pedestrian to the car (and/or occupant thereof), and/or may signal detection of the car to the pedestrian. These sensors are arranged to detect items—for instance the car X and the pedestrian 6—on different exterior sides of the bus 5. The sensing system is configured, based on the locations of the road users and on a location or a 2D contour or 3D-shape of the bus 5, to detect that the bus 5 may block line-of-sight between these road users.

For example, the bus 5 may emit sound (for example by honking the horn 7) to warn the pedestrian 6 of the car X. The emitted sound is partially represented, schematically, as sound waves 715 propagating towards the crosswalk 000.

Additionally or alternatively, for example, the bus 5 may illuminate the warning light 8 to warn the car X (and/or occupant thereof) of the pedestrian 6. Light emitted by the illuminated warning light 8 is partially represented, schematically, as light rays 8R extending radially from the warning light.

When the warning light 8 is also visible to the pedestrian 6, the light rays 8R emitted therefrom may also serve to warn the pedestrian.

It is also contemplated, as an alternative or in addition to a sound emission device 71 and/or a warning light 8, to provide a projection device 81 to project an image 81 in order to warn one or more road users. A projection device 81 is a non-limiting example of a light source.

For example, the projection device 81 may be configured to project one or more images 81 onto the road surface (for example onto the street 00 and/or crosswalk 000) in a vicinity of the intersection of the itineraries 61, XI of the pedestrian 6 and car X.

Additionally or alternatively, an illuminatable sign 82 may be provided in order to warn one or more road users. An illuminatable sign is a non-limiting example of a light source.

For example, the illuminatable sign 82 may be arranged so as to be visible (when illuminated) by a road user observing a rear exterior side 53R of the bus 5. The illuminatable sign 82 may be illuminated to convey a warning message, for example, to warn approaching vehicles (and/or their occupant/s) of pedestrians.

The bus 5 may be configured to determine a probability of collision between the pedestrian 6 and the car X. For example, when the pedestrian 6 is within the detection area 21 of the front camera 2, the data corresponding to the detection area 21 of the front camera 2 may be classified on the basis of one or more item archetypes (for example road users versus non-road-users). Classifying the data from the front camera 2 (for example image data) may allow the pedestrian 6 to be identified as such.

The one or more item archetypes may include one or more road user archetypes. These one or more road user archetypes may include one or more vehicle archetypes and/or one or more non-vehicle archetypes. Vehicle archetypes may include one or more motor vehicles archetypes and/or one or more human-powered vehicle archetypes. Human-powered vehicle archetypes may include a bicycle, for example. Motor vehicle archetypes may include one or more heavy vehicle archetypes (for example buses and/or tractor-trailers) and/or one or more light vehicle archetypes (for example electric kick scooters and/or motorcycles). Motor vehicles may additionally be classified according to archetypes related to human or autonomous driving, for example.

Non-vehicle archetypes may include humans and non-human animals. Humans may additionally be classified according to archetypes related to predictability in executing a given itinerary and/or in responding to signaling in a given manner conducive to safety (for example adults versus children) and/or attentiveness (for example pedestrian using telephone versus pedestrian surveying traffic).

Each archetype corresponds to characteristics that are relevant in determining whether or not the warning system should perform signaling. For example, a stationary road user may be detected as ready to move or not ready to move, depending on its road user archetype.

For example, if the stationary road user is a human or non-human animal, it is always detected as ready to move. On the other hand, if the stationary road user is a vehicle, it is detected as not ready to move when it is parked (for example in a parking space), and may be detected as ready to move when it is not parked. If the vehicle is a human-driven vehicle, it may be detected as not ready to move whenever it is unmanned, for example. If it is a vehicle with an inoperative internal combustion engine, it may be detected as not ready to move if the vehicle lacks other driving motors (for example if it is not a hybrid vehicle).

If a road user is both stationary and detected as not being ready to move, the warning system will not perform signaling to or about said road user.

Each archetype may also correspond to characteristics that are relevant in calculating a probability of collision. For example, a light vehicle road user may be able to stop in a shorter distance, when traveling at a given speed, than a heavy vehicle road user, and so be less likely to cross the itinerary of another road user (have a lower probability of collision with the other road user). An inattentive pedestrian road user may be less reactive to signaling, and therefore more likely to cross the itinerary of another road user (have a higher probability of collision with the other road user), than an attentive pedestrian. If a probability of collision between two road users, which are each detected as either moving or ready to move, is not sufficiently elevated, the warning system will not perform signaling about them.

Similarly, when the car X is within the detection area 43 of the environment sensor 42, the data corresponding to the detection area 43 of the environment sensor 42 may be classified on the basis of one or more item archetypes. When the environment sensor 43 does not include a camera, the item archetypes provided for classification of the data from the detection area of the environment sensor may be defined in a different manner from the archetypes provided for classifying data in the detection area 21 of the front camera 2.

The data subjected to classification may depend on what kind(s) of sensor(s) are provided. For example, radargram data may be subjected to classification when a radar sensor is provided. For example, a cloud of points may be subjected to classification when LiDAR is provided.

The car X and/or the pedestrian 6 may be detected as being in motion or ready to move. If a road user is detected as being in motion, it is not necessary to determine whether or not it is ready to move. Detection of a road user as being in motion may be done in a conventional manner, for example through use of a ranging sensor (for example radar) to measure speed with respect to the sensor and/or distance from the sensor.

As a non-limiting example, image data may be used in a conventional manner to in classifying a road user according to an archetype based on the road user's shape and/or movement. LiDAR and/or radar and/or ultrasound data may be used in a conventional manner in classifying a road user according to an archetype based on the road user's speed and/or position. It is also contemplated to fuse data from multiple sensors in classifying a road user according to an archetype.

The movement of the pedestrian 6 as detected by the front camera 2 (or other front sensor) may allow for the bus 5 to predict one or more itineraries 61 of the pedestrian and possibly even his/her speed in executing it/them. Similarly, the movement of the car X as detected by the environment sensor may allow for the bus 5 to predict one or more itineraries XI of the car X and possibly its speed in executing it/them.

As a non-limiting example, the collision probability may be determined to be minimal when the predicted itineraries XI, 61 of the car X and pedestrian 6 do not intersect, whereas the collision probability may be determined to be non-negligible when one or more predicted itineraries of the pedestrian and car do intersect, and the collision probability may be determined to be extreme when predicted execution of the intersecting predicted itineraries would bring the pedestrian and car into contact with each other.

As a non-limiting example, the warning system include can a neural network for classifying the data according to the item archetypes and/or for predicting the itineraries and/or for determining the collision probability.

The bus 5 may be configured to signal detection of the car X to the pedestrian 6, and/or to signal detection of the pedestrian to the car (and/or occupant thereof), when the probability of collision exceeds a predetermined collision threshold. As an example, signaling may be withheld when the collision threshold is not exceeded, such that the signaling is performed only when the probability of the collision matches or exceeds the collision threshold. Additionally or alternatively, for example, signaling may be performed according to a first signaling mode when the probability of collision is below the collision threshold (for example to signal to the pedestrian 6 to proceed with caution), and may be performed according to a second signaling mode when the probability of collision is equal to or greater than the threshold (for example to signal to the pedestrian to stop/wait). The threshold level may be determined and/or adjusted in a conventional manner.

It is also contemplated for the probability of collision to be updated one or more times. For example, if the front camera 2 detects that a traffic signal has changed from red to green, the probability of collision may be increased as vehicles previously stopped at the red traffic signal may be increasingly likely to become mobile and collide with the pedestrian 6.

Figure 4:
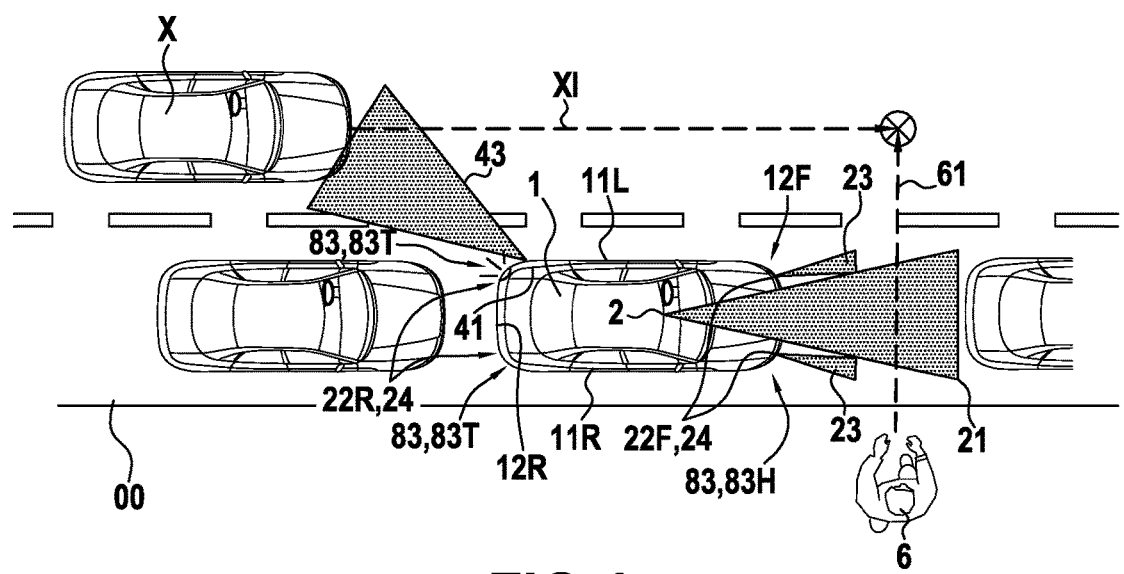
FIG. 4 shows a schematic of an exemplary vehicle parked on a roadside.

FIG. 4 shows a first road user (in this case a pedestrian 6) attempting to cross a street 00 on which a first car 1 (in this case the car 1 seen in FIG. 1) is parallel-parked (a non-limiting example of being in a parked mode). As such, the first car 1 may be considered to be in a non-drivable state. If the first car 1 includes an internal-combustion engine, the engine may be understood to be inactive when the first car 1 is in a non-drivable state.

Detection areas 21, 43 of the front camera 2 and ranging system 4 of the first car 1 are represented as triangular/conical/pyramidal regions extending respectively from the respective positions of these components on the first car.

In addition, or as an alternative to the front camera 2, the first car 1 may include one or more additional front sensors. For example, two front parking assistance 22F sensors are provided on left and right portions of the first car's front exterior side 12F. Detection areas 23 of the front parking assistance sensors 22F are represented as triangular/conical/pyramidal regions extending forward from the first car 1 from the respective front parking assistance sensors. The first car 1 may additionally or alternatively include one or more rear parking assist sensors 22R.

As a non-limiting example the parking assistance sensor (s) 22F, 22R may include a ranging system (in this case one or more ultrasonic sensors 24). It may be understood that parking one or more parking assistance sensors (ultrasonic or not) may also be provided for the bus 5 of FIG. 3.

The itinerary 61 of the pedestrian 6 is partially represented by an arrow traversing an area in the vicinity of the front exterior side 12F of the first car 1. In following this itinerary 61, the pedestrian 6 moves a vicinity of the first car's right exterior side 11R to a vicinity of the first car's left exterior side 11L. In so doing, the pedestrian 6 is made to enter one or more detection areas 23, 21 of the parking assist sensors 22F, 22R and/or front camera 2.

A second road user (in this case a second car X) is shown driving along the street 00 next to the first car 1, such that the second car X passes in a vicinity of the left exterior side 11L of the first car from a vicinity of the rear exterior side 12R of the first car 1 to the vicinity of the front exterior side 12F of the first car. The itinerary XI of the second car X is partially represented as an arrow. In following this itinerary XI, the second car X is made to enter the detection area 43 of the ranging system 4 of the first car 1.

As observed with FIG. 3, the itineraries 61, XI of the pedestrian 6 and second car X in FIG. 4 are seen to intersect one another, which could lead to a collision between the pedestrian and the second car, and the presence of the first car 1 with respect to the pedestrian and the second car may interfere with their ability to undertake efforts to avoid such a collision.

The first car 1 may warn the pedestrian 6 of the second car X by illuminating its lights 83 in a vicinity of the pedestrian (for example its headlights 83H) and/or by emitting a sound (for example from its horn 7). Additionally or alternatively, the first car 1 may warn the second car X of the pedestrian 6 by illuminating its lights 83 in a vicinity of the second car (for example its taillights 83T).

Figure 5:
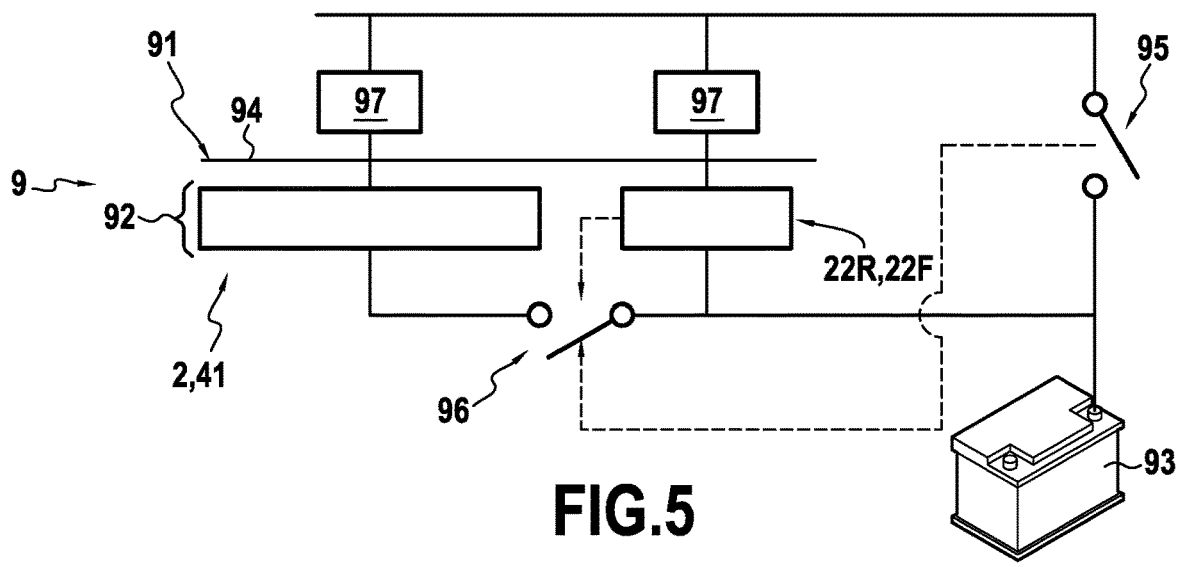
FIG. 5 shows a schematic of an exemplary warning system.

FIG. 5 shows a schematic view of the warning system 9 seen in FIG. 2, in this case, as provided within a vehicle, such as the car 1 of FIG. 1 or the bus 5 of FIG. 3.

The warning system 9 is configured to be connected to an electrical energy source (for example the vehicle's battery 93).

The signaling system 91 is partially represented as the vehicle's Controller Area Network 94, which may be configured to control the vehicle's light source(s) and/or sound emission device(s). In this regard, the vehicle's light source (s) may be considered to be a visual signaling unit of the signaling system and/or the sound emission device(s) may be considered to be an acoustic signaling unit of the signaling system 91. The vehicle's controller area network 94 may serve at least in part as a processing unit for the warning system 9.

The sensing system 92 includes the front camera 2 (or equivalent), the short range radar 41 (or equivalent), and the (ultrasonic) front/rear parking assistance sensor/s 22F, 22R (or equivalent), and computational resources related to controlling these sensors and/or analyzing their readings.

The energy required for operating and/or controlling and/or analyzing readings from a camera and/or radar may be higher than that for operating and/or controlling and/or analyzing readings from one or more ultrasonic sensors. Accordingly, the front camera 2 and short wave radar may be considered to be sensors with high energy needs, whereas the ultrasonic front and/or rear parking assistance sensor(s) 22F, 22R may be considered to have low energy needs.

The vehicular warning system 9 is configured to enter a low-power mode in response to the vehicle's ignition switch 95 being placed in an "off" position. It may be understood that, if the vehicle includes an internal combustion engine, said internal combustion engine would be deactivated while the vehicle's ignition switch 95 is in the "off" position. Independently of whether the vehicle includes an internal combustion engine, if the vehicle is a manned vehicle (that is, a vehicle operated by and/or capable of transporting a human occupant), the off position of the vehicle's ignition switch may correspond to a vehicle state in which the vehicle lacks human occupants.

In the low-power mode, the sensors (and possibly their associated computational resources) with comparatively high energy needs, such as the front camera 2 and the short range radar 41, may be deactivated or even unpowered, whereas components with relatively low energy needs, such as the front and rear parking assistance sensor(s) 22F, 22R, may remain activated (along with their associated computational resources). This is represented schematically by a mode switch 96 (shown in an open state) arranged between the sensors with high energy needs and the battery 93, and by the sensor(s) with low energy needs being connected directly to the battery instead of by way of the mode switch.

When the activated sensor(s) detect(s) a possible road user, the warning system may perform a "waking up" function in which the powered-off/deactivated sensor(s) are activated (as well as their associated computational resources when appropriate). This is represented schematically by the sensor(s) with low energy needs being able to deliver a signal to the mode switch 96.

For example, the waking up function may be triggered when the parking assistance sensor(s) 22F, 22R detect(s) movement.

The waking up function may place the warning system 9 in a full-power mode (in which the mode switch 96 would be represented as being in a closed state). Waking up in this manner, and subsequent operation in the full-power mode, may be performed while the ignition switch remains off.

The warning system may also/alternatively enter the full-power mode in response to the vehicle's ignition switch being placed in an "on" position. This is represented schematically by the ignition switch 95 being able to deliver a signal to the mode switch 96. It may be understood that entering the full-power mode in response to the vehicle's ignition switch 95 being placed in the on position may occur regardless of whether the warning system 9 is provided with a low-power mode.

Figure 6:
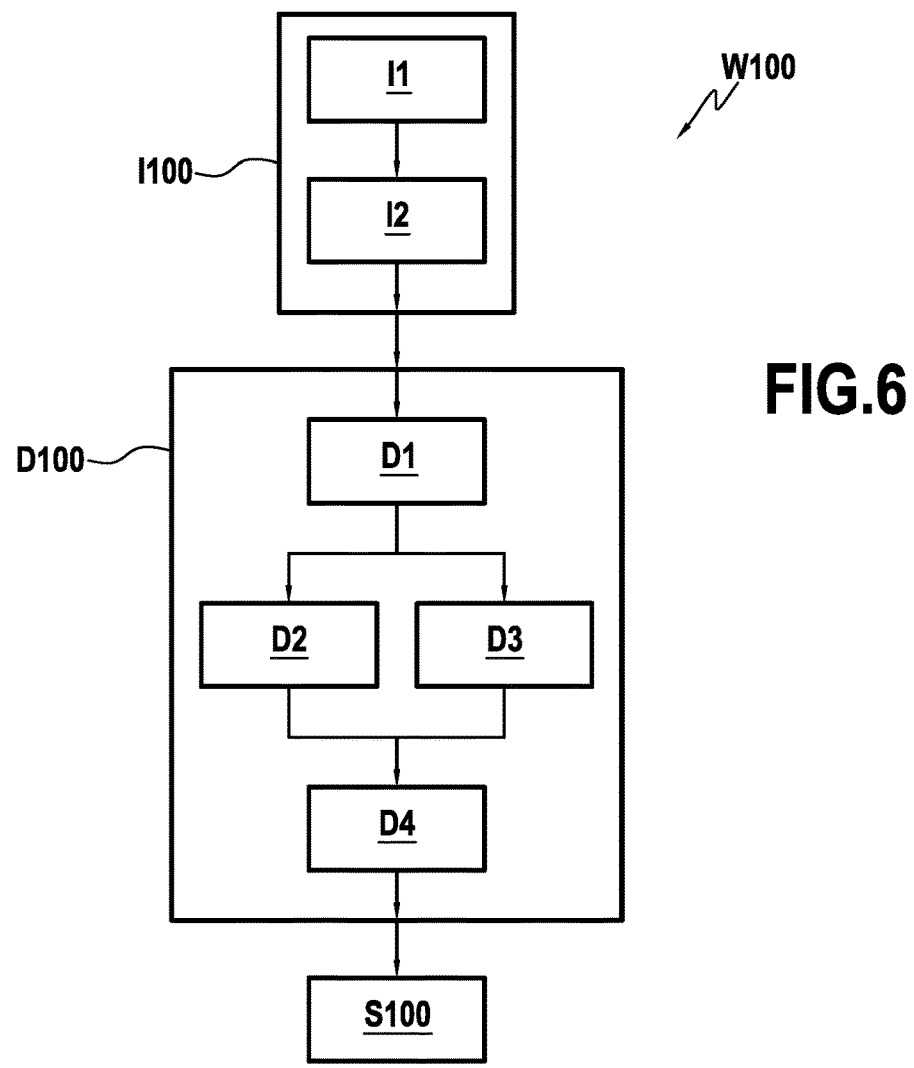
FIG. 6 shows an exemplary process flow diagram.

FIG. 6 shows a process flow diagram corresponding to the operation of the warning process W100 of the vehicle(s) described earlier herein and/or warning system thereof. Such a warning process W100 may be provided as a computer program including instructions which may cause a computer to carry out the warning process when executed thereby. The computer program may be delivered to such a computer, for example, by providing a data carrier signal carrying the computer program, or a computer-readable medium including instructions for the computer program.

The warning process W100 includes a detecting phase D100 and a signaling phase S100, and an optional waiting phase I100.

The detecting phase D100 may include a monitoring step D1, in which the warning system monitors its sensors' detection areas for road users.

The warning process may advance to an optional determining step D4 subsequent to detecting D2 a first road user (for example the pedestrian) on a first side of the vehicle and detecting D3 a second road user (for example the second car) on a second side of the vehicle.

As an option, the process may return to the monitoring step D1 if the steps of detecting D2 the first road user and detecting D3 the second road user are not performed substantially concurrently. However, it is also contemplated to advance further beyond the monitoring step D1 if the detecting steps D2-D3 are performed within a predetermined time of one another (for example within a minute of each other, or within 30 seconds of each other, or within 15 seconds of each other, or within 10 seconds of each other, or within 5 seconds of each other). For example, if an animal road user (for example a child) had been detected within a predetermined time prior to detection of a vehicle road user, it may be useful to signal to the vehicle road user, since another animal road user (for example a parent of the child) may be nearby.

During the detecting step(s) D2 and/or D3, the first and/or second road user(s) are identified according to road user archetypes. To identify a road user according to a road user archetype, an object may be identified as a road user, and classified according to the archetypes. Classifying a road user in this manner may help to estimate whether or how a road user may be able to respond to signaling.

During the determining step D4, a probability of a collision may be calculated and then compared to a collision threshold. The result of this comparison may influence whether the warning system advances to the signaling phase S100 and/or how the signaling phase is executed. If no determining step D4 is provided, the process may simply advance to the signaling phase S100.

The signaling phase S100 may include illumination of one or more light sources and/or emission of one or more sounds in order to warn the first road user of the second road user and/or in order to warn the second road user of the first road user.

When present, the waiting phase I100, may be performed prior to the detecting phase D100.

During the waiting phase I100, the warning system may ignore a first road user if it belongs to one or more excluded archetypes and/or is located in one or more excluded areas with respect to the vehicle. The waiting phase I100 may include a searching step I1, followed by a waking step I2.

During the searching step I1, the warning system may be in its low-power mode, for example. The warning system may search for a second road user (different from the first road user) belonging to a non-excluded archetype and/or located in a non-excluded location (for example a pedestrian in front of the vehicle). When the second road user is detected, the warning system may execute the waking step I2.

During the waking step I2, the warning system may perform its waking up function and cease ignoring the first road user.

The detecting phase D100 may be performed subsequent to the waiting phase I100. During the detecting phase D100, the warning system may be in its full-power mode.

The waiting phase I100 may also progress from the searching step I1 to the waking step I2 in response to the ignition switch of the vehicle being placed in the on position.

When the vehicular road user is autonomously-driven (as with an autonomous vehicle, for example), signaling the autonomously-driven road user may include transmission of a message to the autonomously-driven road user to indicate one or more driving maneuvers (for example decelerate) that should be undertaken to reduce the probability of a collision and/or the danger represented thereby. Such a message may be transmitted in parallel with the visual and/or acoustic signaling described earlier herein, for example so that both the autonomous driving system of the vehicle and the human occupant of the vehicle may each be warned.

Although the foregoing examples are described with respect to warning a pedestrian and/or a car (or occupant thereof), no limitation as to particular road user types is intended. For example, a (motor)cyclist may be warned about the presence of a deer, dog, tortoise or snowmobile. Moreover, non-human animal road users may be prompted abandon a particular collision-inducing itinerary when warned about the presence of a human or vehicular road user.

Although the foregoing examples are described with respect to a right-hand traffic, left-hand traffic variants are also contemplated. It may be understood that, in a left-hand traffic variant, detection and/or signaling capabilities that are described as being provided on the left side of a right-hand traffic variant would be provided on the right side of the left-hand traffic variant, and that detection and/or signaling capabilities described as being provided on the right side of the right-hand traffic variant would be provided on the left side of the left-hand traffic variant. It may also be understood that detection and/or signaling capabilities may be provided on both left and right sides, regardless of road traffic handedness.

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term "comprising a" should be understood as being synonymous with "comprising at least one" unless otherwise stated. Throughout the description, including the claims, the term "including a" should be understood as being synonymous with "including at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A process for warning a first road user present on a first exterior side of an object, of a second road user's presence on a second exterior side of the object, the second side being different from the first side and the object being situated between the first road user and the second road user, comprising:
    detecting the first road user on the first exterior side of the object;
    detecting the second road user on the second exterior side of the object, the first road user and the second road user being detected to be moving or ready to move relative to the object;
    classifying the first road user and the second road user as one or more road user archetypes based on received sensor data;
    upon determination that a first one of the first road user or the second road user is a human or a non-human animal, determine that the first one of the first road user or the second road user is ready to move;
    upon determination that a second one of the first road user or the second road user is a vehicle, determine that the second one of the first road user is ready to move when it is not parked; and
    signaling detection of the second road user to the first road user.

2. The process of claim 1, wherein signaling detection of the second road user to the first road user is performed when the first road user and the second road users are detected concurrently.

3. The process of claim 1, comprising determining whether a probability of a collision between the first road user and the second road user exceeds a collision threshold, and wherein signaling is performed only when the probability of the collision exceeds the collision threshold.

4. The process of claim 1, including signaling detection of the first road user to the second road user.

5. The process of claim 1, comprising signaling detection of the second road user to the first road user when the first road user and the second road user are detected non-concurrently.

6. The process of claim 1, comprising waiting to detect the second road user until the first road user has been detected, said waiting including placing a warning system in a low-power mode, the process further comprising an activation step comprising switching the warning system to a full power mode in which detection of the second road user is possible, the activation step being carried out when the first road user has been detected.

7. The process of claim 1, wherein signaling comprises one or more of illuminating a light source or emitting a sound.

8. The process of claim 7, wherein signaling comprises one or more of projecting an image in a vicinity of the object or displaying an illuminated sign.

9. The process of claim 1, comprising classifying one or more of the first road user or the second road user on the basis of one or more road user archetypes.

10. The process of claim 1, wherein the object is a vehicle.

11. The process of claim 10, wherein the vehicle is a manned vehicle and the process is performed while one or more of the following situations exists: the vehicle lacks occupants or the vehicle is in a deactivated state.

12. The process of claim 10, wherein the vehicle includes an internal combustion engine and one or more of the step of detecting the first road user or the step of detecting the second road user is performed when the internal combustion engine is deactivated.

13. A vehicle, configured to implement the process of claim 1.

14. The vehicle according to claim 13, configured to limit electrical energy supplied for detecting the second road user when the vehicle is placed in a parked mode.

15. A non-transitory computer-readable medium storing a computer program comprising instructions which, when the program is executed by a computer, cause the computer to carry out the process of claim 1.

16. A warning system, comprising a sensing system, configured to detect a first road user at a first location and detect a second road user at a second location with respect to an object situated between the first road user and the second road user and to detect that the first road user and the second road users are in motion or ready to be in motion with respect to the object, and a signaling system configured to perform one or more of the following:
- classifying the first road user and the second road user as one or more road user archetypes based on received sensor data;
- upon determination that a first one of the first road user or the second road user is a human or a non-human animal, determine that the first one of the first road user or the second road user is ready to move;
- upon determination that a second one of the first road user or the second road user is a vehicle, determine that the second one of the first road user is ready to move when it is not parked;
- signaling to the first road user that the sensing system has detected the second road user; and
- signaling to the second road user that the sensing system has detected the first road user.

17. The warning system of claim 16, wherein the signaling system (91) comprises one or more of a visual signaling unit or an acoustic signaling unit.

18. The warning system of claim 16, wherein the sensing system comprises a ranging system configured to output a distance to a detected item.

19. The warning system of claim 16, wherein the sensing system includes one or more of the following: a radar antenna, an ultrasound receiver, a LiDAR, a camera.

20. The warning system of claim 16, comprising a processing unit configured to perform at least one of the following:
- determining a likelihood of a collision between the first and second road users, comparing the likelihood of the collision to a collision threshold and performing signaling only when the probability of the collision exceeds the collision threshold,
- classifying one or more of the first user or second road user according to one or more road user archetypes.

21. The warning system of claim 16, wherein the first location is in a vicinity of a first exterior side of a vehicle, and the second location is in a vicinity of a second exterior side of the vehicle, the second exterior side being different from the first exterior side.

* * * * *